United States Patent [19]
Hoover

[11] 3,811,656
[45] May 21, 1974

[54] CABLE WINCH HAVING VARIABLE RATIO INTERLOCK

[76] Inventor: Charles J. Hoover, Box 173, Mill City, Oreg. 97360

[22] Filed: June 26, 1972

[21] Appl. No.: 266,073

[52] U.S. Cl. ............................................. 254/184
[51] Int. Cl. ............................................. B65d 1/26
[58] Field of Search .................... 254/184, 185 AB; 74/665 GA, 665 GE

[56] References Cited
UNITED STATES PATENTS
R26,505    12/1968   Thompson .................. 254/185 AB
2,487,702  11/1949   Goodwillie et al. ........ 74/665 GE X
2,652,910   9/1953   Godeck ...................... 74/665 GA X
3,282,569  11/1966   Thompson ........................ 254/184

Primary Examiner—Evon C. Blunk
Assistant Examiner—H.S. Lane

[57] ABSTRACT

A cable winch having a reversible power shift transmission connected to drive shafting, a pair of driven shafts, a two-speed transmission interposed between the drive shafting and each of the driven shafts, and a chain connecting each of the driven shafts to a cable drum so as to enable each of the cable drums to rotate at a relatively high speed or a relatively low speed.

6 Claims, 5 Drawing Figures

CABLE WINCH HAVING VARIABLE RATIO INTERLOCK

BACKGROUND OF THE INVENTION

In multiple drum cable winches, it is known to have two rotatably mounted drums about which cables are spooled and to rotate the drums in opposite directions so that one drum will spool cable thereon while the other drum is unspooling cable therefrom. The cables are connected to a payload, such as logs in a logging operation; and it is desirable that the linear speed at which cable is being spooled onto one drum be close to the linear speed at which cable is being unspooled from the other drum. Since the number of wraps of the cable about the drums, and thus the diameters of the cables on the drums, changes during the spooling and unspooling operations, the linear speeds of cable spooling and unspooling will vary if the drum rotational speeds are constant.

U.S. Pat. Nos. Re. 26,505; 3,282,569; 3,405,878; 3,436,056; and 3,510,107 disclose cable winches having mechanisms for changing the relative rotational speeds of the drums so as to reduce the variations in linear speeds of the cables that are being spooled and unspooled.

SUMMARY OF THE INVENTION

The cable winch of this invention incorporates an improved mechanism for ensuring correspondence in the linear speeds of spooling and unspooling during the entire operation of the cable drums. This is accomplished by providing drive shafting that is connected to a pair of two-speed transmissions of the torque conversion type. Each two-speed transmission rotates a driven shaft at a relatively high speed or a relatively low speed, and correspondingly relatively low or high torque respectively, and each driven shaft is connected to a cable drum to rotate each cable drum at a speed corresponding to the rotational speed of its associated driven shaft. This arrangement permits the operator, by appropriate adjustments of the two-speed transmissions, to maintain the linear speeds of spooling and unspooling close to each other during the entire spooling and unspooling operations of the cable winch. The drive shafting is connected to a reversible powered means so as to enable each of the drums to serve as a spooling drum or as an unspooling drum.

In addition to providing an effective arrangement for maintaining a close relationship in the linear speeds of spooling and unspooling during the entire operation of the cable winch, the mechanism of this invention minimizes the strain on the winch parts when changing the rotational speed of the drums by placing the speed changing mechanisms in an intermediate part of the power drive train between the powered means and the cable drums rather than at that portion of the power drive train that is directly connected to the cable drums. This has the beneficial effect of providing a more compact unit using less expensive components.

DESCRIPTION OF THE PREFERRED EMBODIMENT

Figure 1:
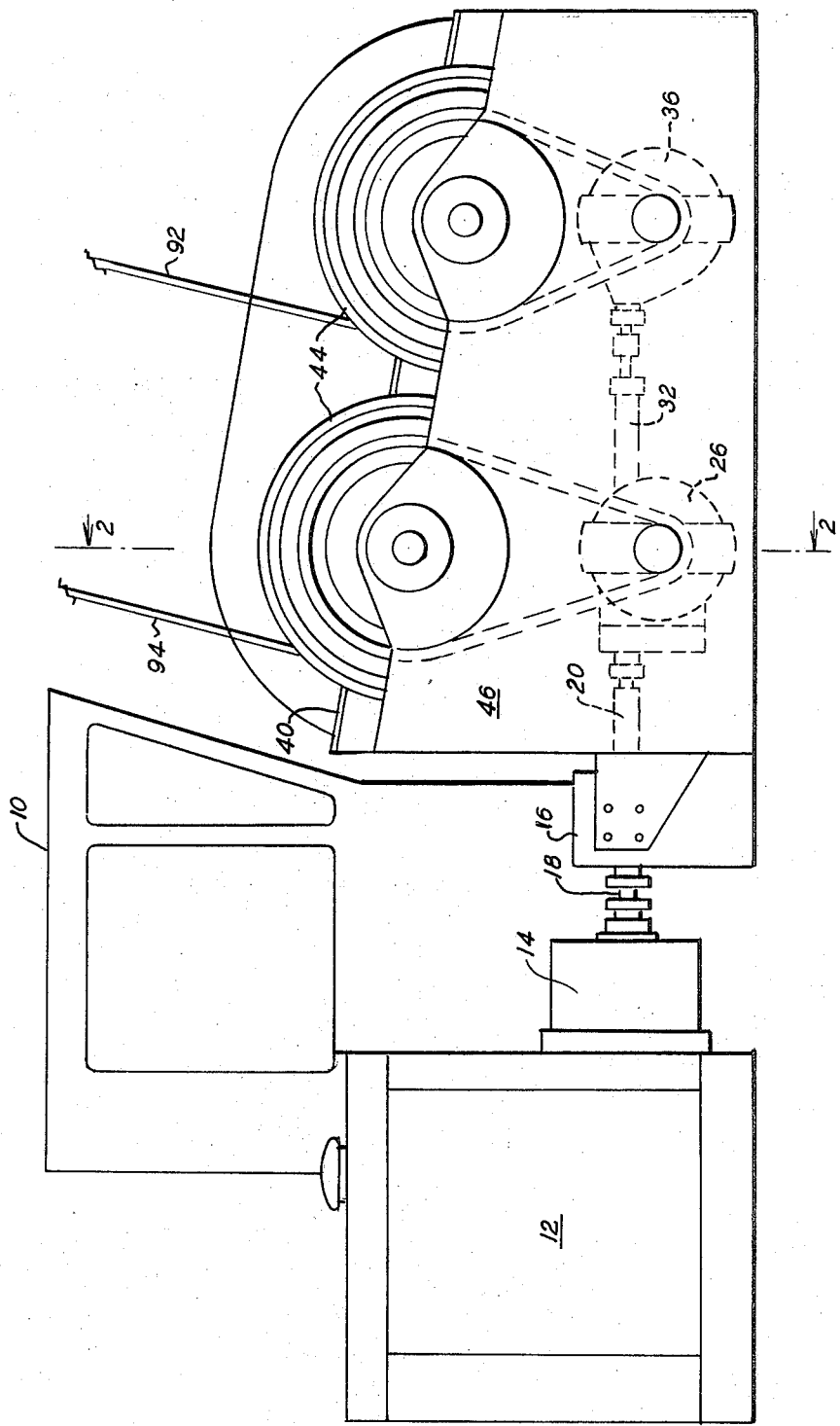
FIG. 1 is a side elevation of the cable winch.
Figure 3:
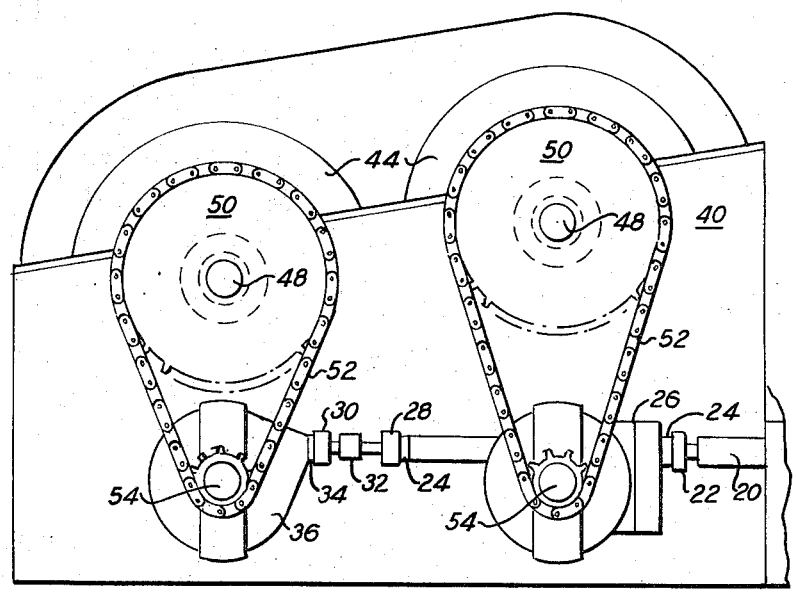
FIG. 3 is a view taken along the line 3—3 of FIG. 2.

Referring to FIG. 1, the cable winch includes an operator's cab 10 in which are located the controls for operating the various winch parts, a power source 12 in the form of a diesel engine, a torque converter 14 driven by the power source, and a multiple speed reversible power shift transmission 16 that is driven from the torque converter 14 by a shaft 18. The transmission 16 is operable to cause the power source 12 to rotate a drive shafting element 20. The shafting element 20 is coupled, by means of a universal coupling 22 (FIG. 3) to a shafting element 24 that extends through and is rotatably mounted in a housing 26. The end of the shafting element 24 remote from the shafting element 20 is coupled by means of universal joints 28 and 30 and a shafting element 32 to a shafting element 34 that extends into and is rotatably mounted in a housing 36.

Figure 2:
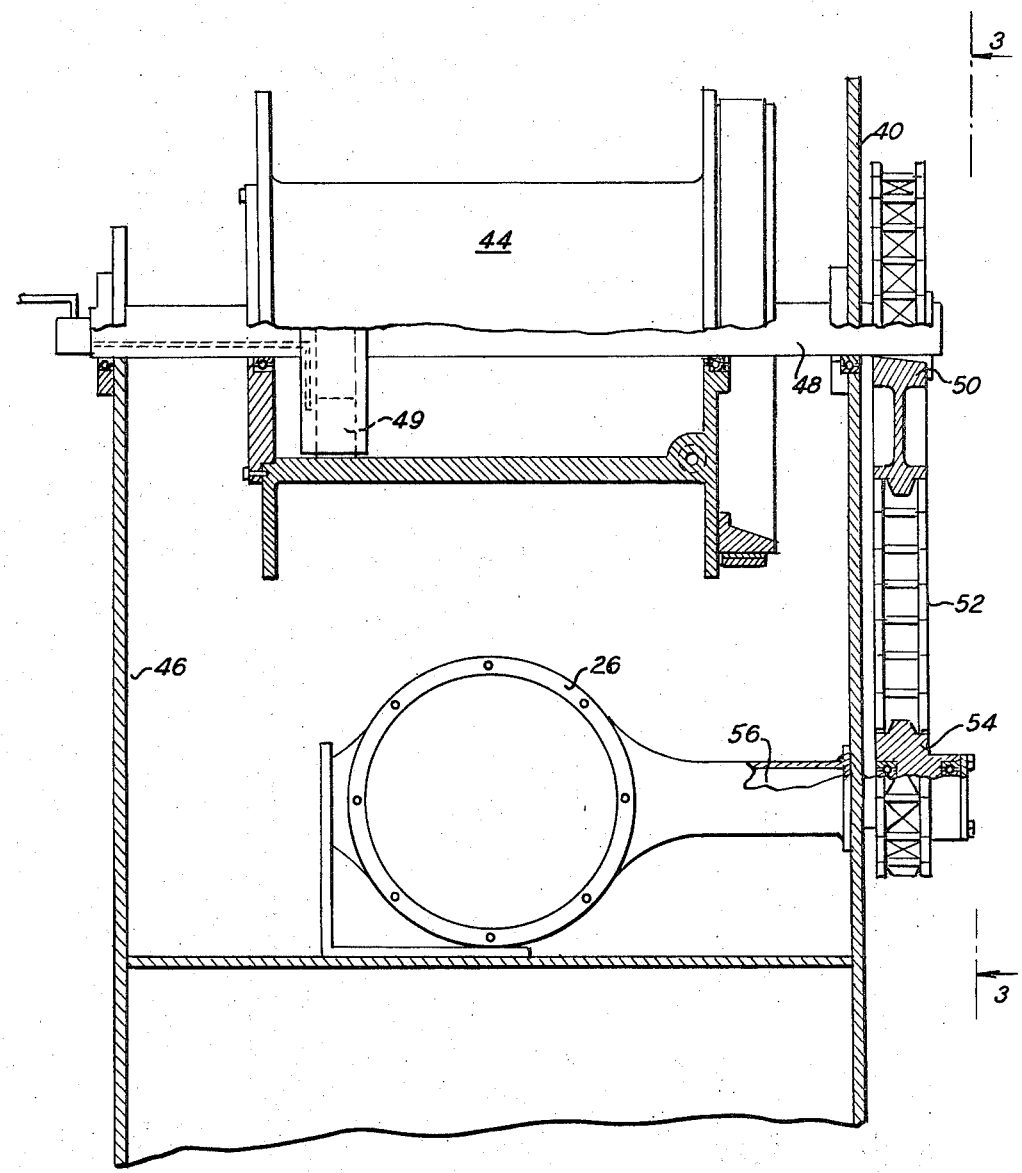
FIG. 2 is a section taken along the line 2—2 of FIG. 1.

A cable drum 44, constructed similarly to the cable drum in pending application Ser. No. 217,143 filed Jan. 12, 1972, is rotatably mounted between sidewalls 40 and sidewall 46 of the winch frame (see FIG. 2). Each drum 44 is rotatably mounted on a shaft 48 and may be caused by actuation of a clutch 49, in the manner shown in said application Ser. No. 217,143, to be so connected to its shaft 48 as to be rotatable in unison therewith or to slip with respect thereto. Each shaft 48 is rotatably mounted to the sidewalls 40 and 46 and extends through the sidewall 40. A sprocket 50 is rigidly secured to each shaft 48 outwardly of the sidewall 40. Chains 52 drivingly connect each of the sprockets 50 to a sprocket 54. Each sprocket 54 is rigidly mounted to a driven shaft 56, one of the shafts 56 extending through the sidewall 40 from the housing 26 and the other shaft 56 extending through the sidewall 40 from the housing 36.

Figure 4:
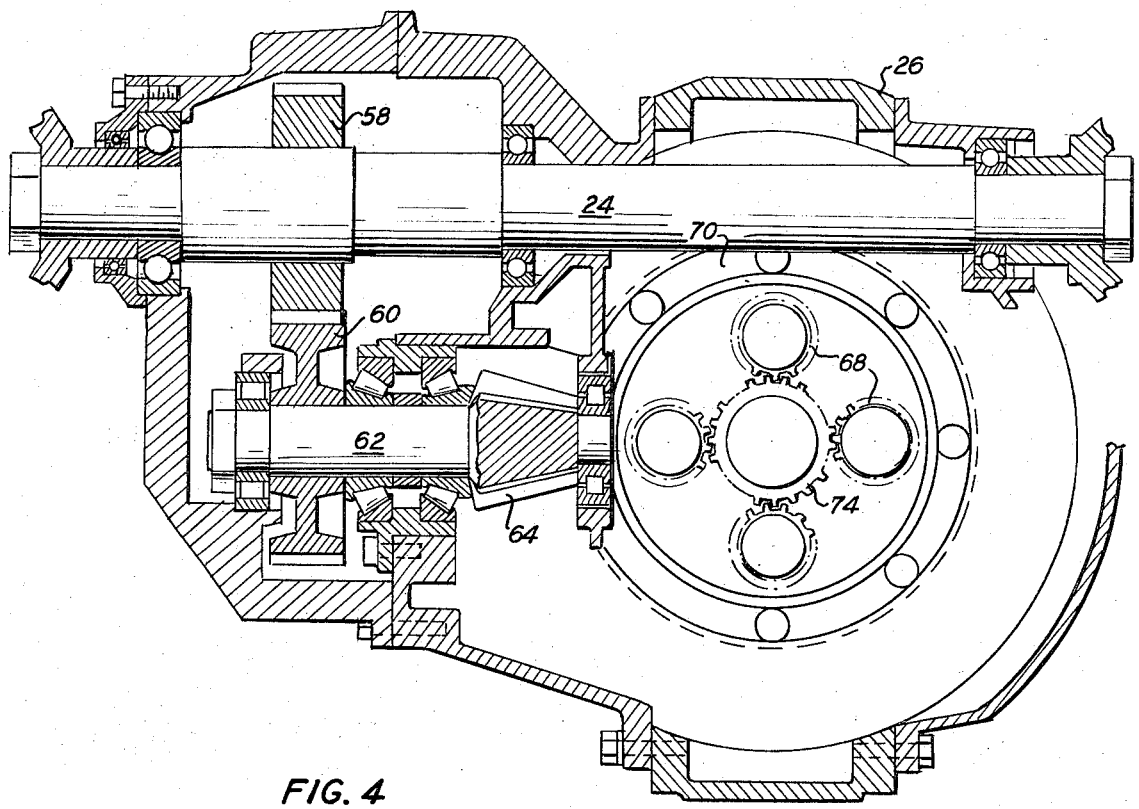
FIG. 4 is a side view in section showing a first one of the two-speed transmissions and a shafting element extending therethrough.
Figure 5:
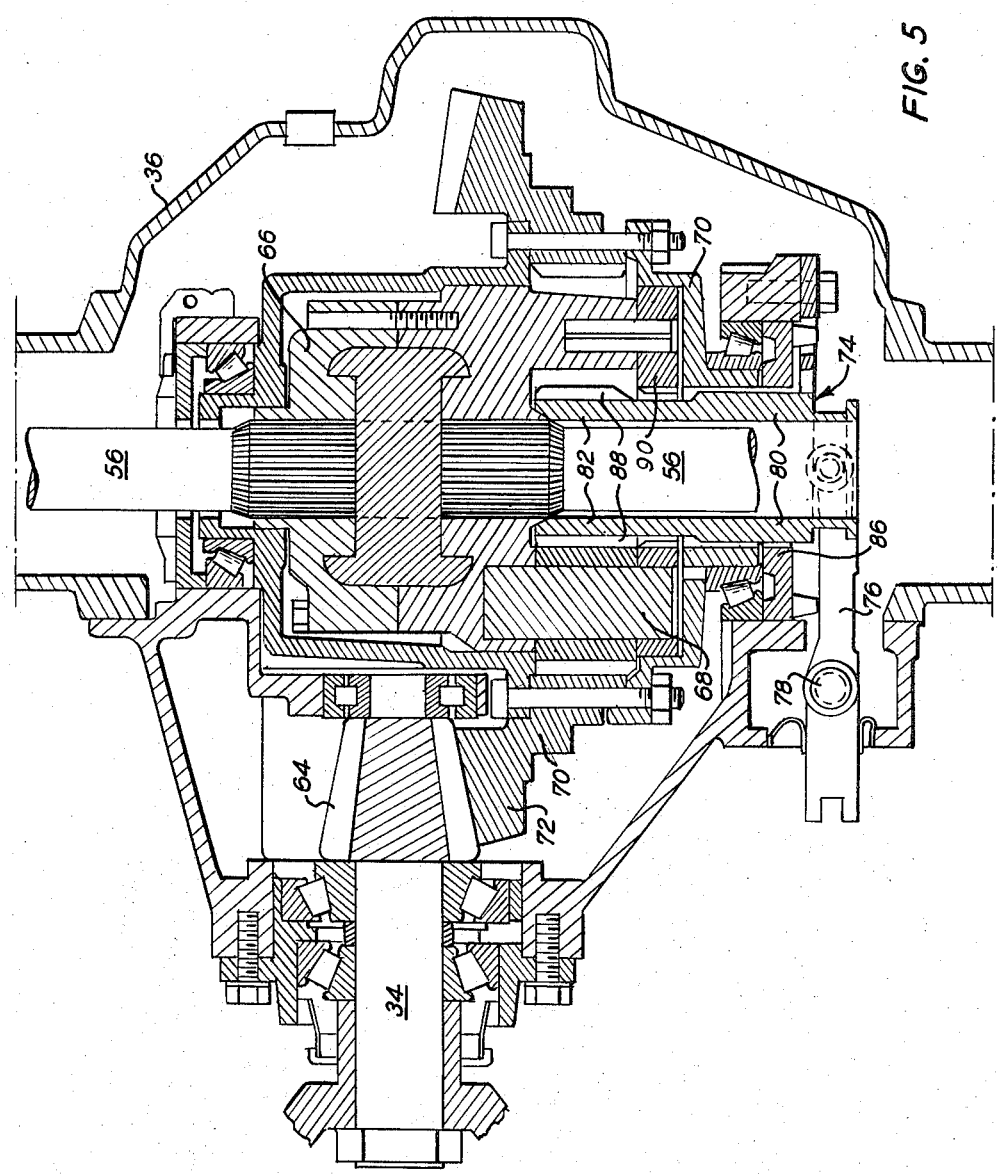
FIG. 5 is a plan view in section showing the other of the two-speed transmissions.

Referring to FIGS. 4 and 5, bevel pinions 64 are mounted to a shaft 62 that is rotatably mounted in the housing 26 and to the shaft 34. The bevel pinions 64 are located within the housings 26 and 36. The shaft 62 is connected by spur gears 58 and 60 to the shafting element 24 whereby the bevel pinions 64 in the housings 26 and 36 rotate in opposite directions in response to the rotation of the shafting elements 24 and 34.

Each of the shafts 56 has a support 66 mounted thereon for rotation in unison therewith. The supports 66 each rotatably mount a plurality of planetary gears 68. The gears 68 are in mesh with a ring gear 70 that is rotatably mounted in the housings 26 and 36, and each ring gear 70 is in mesh, by means of a bevel gear 72, with its associated bevel pinion 64. The planetary gears 68 are in mesh with a sun gear 74 that takes the form of a hub that is mounted for movement in the housings 26 and 36 axially of its associated shaft 56. Each hub 74 is pivoted to a lever 76 that is pivoted to the housing 26 or 36 in a pivot pin 78 whereby swinging of the levers 76 about the axes of the pivot pins 78 causes axial shifting of the hubs 74.

Each hub 74 has an outer large diameter portion 80 and an inner small diameter portion 82. When the hubs 74 are caused by the levers 76 to be in their inner FIG.

5 position, clutch teeth on the large diameter portions 80 are locked to clutch plates 86 that are rigidly secured to the housing 26 and 36 to thus lock the sun gear hubs 74 against rotation in the housings. When the hubs 74 are moved outwardly of the housings by the levers 76, the large diameter portions 80 are moved outwardly of the clutch plates 86 and the gear teeth 88 on the hub 74, while remaining in mesh with the gear teeth on the planetary gears 68, engage clutch plates 90 that are mounted to the supports 66, thus enabling the hub-sun gears 74 and the supports 66 to rotate in unison.

From the foregoing, it can be seen that when the hub-sun gears 74 are in their inner FIG. 5 positions with the hub-sun gears locked against rotation, the rotation of the ring gears 70 by the bevel pinions 64 causes the planetary gears 68 to rotate about the hub-sun gears 74 and thus causes the supports 66, together with the shafts 56, to rotate at a relatively low speed and a relatively high torque. When the hub-sun gears 74 are in their outer position with the gear teeth 88 engaging the clutch plates 90, the hub-sun gears can rotate in unison with the support 66 so that the rotation of the ring gears 70 by the bevel pinions 64 causes the shafts 56 to rotate at a relatively high speed and a relatively low torque.

Due to the rotation of the bevel pinions 64 in the housings 26 and 36 in opposite directions, the rotation of the shafting elements 24 and 34 causes the shafts 56 in the housings 26 and 36 to also rotate in opposite directions.

The levers 76 may be swung about the axes of their pivot pins 78 to shift the hub-sun gears 74 inwardly or outwardly by any desired arrangement as, for example, by being connected to pneumatically actuated air-torsion spring shift units manufactured by Eaton Manufacturing Company.

Referring to FIG. 1, a cable 92 is wrapped about the right cable drum 44 associated with the housing 36 and a cable 94 is wrapped about the left cable drum 44 associated with the housing 26. These cables are intended to be attached to a payload in any desired operation, as for example, a logging operation. The reversible transmission 16 and the shafting formed by the shafting elements 20, 24, 28, and 34 and the drives (FIGS. 4 and 5) between the shafting elements 24 and 34 and the shafts 56 enable the shafts 56, by way of the sprockets 54, the chains 52, and the sprockets 50 and the shafts 48 to rotate the drums 44 in opposite directions so that while one drum 44 is unspooling, its cable 92 or 94, the other drum 44 is spooling its cable. The cables 92 and 94 are connected to the payload in a conventional manner and one drum should be spooling its cable at as close to a constant linear rate as is feasible while the other drum is unspooling its cable at a linear rate as close to this constant linear rate as is feabible. Any departure from these constant rates may be compensated for through the operation of the clutch 50 in the manner described in the aforementioned application Ser. No. 217,143.

Since the linear rate at which the cable 92 or 94 is wound or unwound on the drums 44 is dependent on the number of wraps of the cable on the drums, the rotational velocity of drums must be adjusted during the rotation of the drums, and this is done by actuation of the levers 76 to cause the two-speed transmissions shown in FIGS. 4 and 5 to rotate the shafts 56 at either the relatively high speed or the relatively low speed.

For example, assuming that the shafting system formed by the shafting elements 20, 24, 32 and 34 is being caused by the transmission 16 to rotate in such a direction that the cable 92 is being spooled on its drum 44 and the cable 94 is being unspooled from its drum 44, at the beginning of the operation there would initially be a maximum number of cable wraps on the unspooling drum and a minimum number of cable wraps on the spooling drum. Therefore, initially, the two-speed transmissions would be so operated that the shaft 56 for the unspooling drum is rotating at a relatively low speed or revolutions per minute and at a relatively high torque and the shaft 56 for the spooling drum is rotating at a relatively high speed. As the number of cable wraps on the spooling and unspooling drums approach equalization, both the spooling and unspooling drums will be caused by their shafts 56 to be so operated by their two-speed transmissions that they will rotate at the same speed (either the relatively high speed or the relatively low speed). At the end of the operation, there would be more cable wraps on the spooling drum than on the unspooling drum so that the two-speed transmissions would be so adjusted by actuation of the levers 76 that the shaft 56 for the unspooling drum is rotated at the relatively high speed and the shaft 56 for the spooling drum is rotated at the relatively low speed and at a relatively high torque.

I claim:

1. A cable winch having a variable ratio interlock for synchronizing the rotational speed of two cable drums comprising: drive shafting; powered means for rotating the drive shafting; a pair of rotatably mounted drums adapted to have cable spooled thereon; a rotatably mounted driven shaft associated with each drum; connecting means operably connecting each driven shaft to its associated drum so as to rotate each drum in response to the rotation of its associated driven shaft; and first and second two-speed transmission means of both torque and speed conversion type each interposed respectively between the drive shafting and one of the driven shafts effective to selectively rotate each of the driven shafts together with its associated drum at a relatively high speed and low torque or a relatively low speed and high torque in response to the rotation of the drive shafting at a constant speed, whereby a relatively high torque is applied to the one of the cable drums at the initiation of cable spooling.

2. The winch of claim 1 further comprising: means interposed between one of said driven shafts and the drive shafting effective to cause said one driven shaft to rotate in the opposite direction from the other driven shaft and thus cause the drums to rotate in opposite directions from each other.

3. The winch of claim 1 wherein said drive shafting comprising: a first shafting element; a second shafting element; means connecting a first end of said first shafting element to said powered means; and means connecting the second end of said first shafting element to said second shafting element; and wherein said two-speed transmission means comprises: a first two-speed transmission mechanism interposed between said first shafting element and a first of said driven shafts; and a second two-speed transmission mechanism interposed between said second shafting element and the second of said driven shafts.

4. The winch of claim 3 further comprising: reversing means interposed between said first shafting element and said first two-speed transmission mechanism to cause said first driven shaft to rotate in the opposite direction from said second driven shaft and thus cause the drums to rotate in opposite directions from each other.

5. The winch according to claim 1 wherein said powered means is reversible so as to selectively rotate the drive shafting, and thus the drums, in opposite directions.

6. The winch of claim 5 further comprising: reversing means interposed between one of said driven shafts and the drive shafting effective to cause said one driven shaft to rotate in the opposite direction from the other driven shaft and thus cause the drums to rotate in opposite directions from each other.

* * * * *